(12) United States Patent
Hao et al.

(10) Patent No.: US 8,884,966 B2
(45) Date of Patent: Nov. 11, 2014

(54) VISUALIZING A SCATTER PLOT USING REAL-TIME BACKWARD REWRITE

(75) Inventors: Ming C. Hao, Palo Alto, CA (US);
Umeshwar Dayal, Saratoga, CA (US);
Halldor Janetzko, Konstanz (DE);
Daniel Keim, Steisslingen (DE);
Martha L. Lyons, Sunnyvale, CA (US);
Meichun Hsu, Los Altos Hills, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 584 days.

(21) Appl. No.: 13/216,477

(22) Filed: Aug. 24, 2011

(65) Prior Publication Data

US 2013/0050232 A1    Feb. 28, 2013

(51) Int. Cl.
| | |
|---|---|
| *G06T 11/20* | (2006.01) |
| *G09G 5/02* | (2006.01) |
| *G06F 17/20* | (2006.01) |
| *G09G 5/22* | (2006.01) |

(52) U.S. Cl.
CPC .............. *G09G 5/02* (2013.01); *G06T 11/206* (2013.01); *G06F 17/20* (2013.01); *G09G 5/22* (2013.01)
USPC ......................................................... 345/440

(58) Field of Classification Search
CPC ...................................................... G06T 11/206
See application file for complete search history.

(56) References Cited

U.S. PATENT DOCUMENTS

| | | | |
|---|---|---|---|
| 3,487,308 A | 12/1969 | Johnson | |
| 5,559,548 A | 9/1996 | Davis et al. | |
| 5,588,117 A | 12/1996 | Karp et al. | |
| 5,608,904 A | 3/1997 | Chaudhuri et al. | |
| 5,694,591 A | 12/1997 | Du et al. | |
| 5,742,778 A | 4/1998 | Hao et al. | |
| 5,757,356 A | 5/1998 | Takasaki et al. | |
| 5,828,866 A | 10/1998 | Hao et al. | |
| 5,844,553 A | 12/1998 | Hao et al. | |
| 5,878,206 A | 3/1999 | Chen et al. | |
| 5,903,891 A | 5/1999 | Chen et al. | |
| 5,924,103 A | 7/1999 | Ahmed et al. | |
| 5,940,839 A | 8/1999 | Chen et al. | |
| 5,999,193 A | 12/1999 | Conley, Jr. et al. | |
| 6,052,890 A | 4/2000 | Malagrino, Jr. et al. | |
| 6,115,027 A | 9/2000 | Hao et al. | |
| 6,144,379 A | 11/2000 | Bertram et al. | |
| 6,188,403 B1 | 2/2001 | Sacerdoti et al. | |
| 6,211,887 B1 | 4/2001 | Meier et al. | |
| 6,314,453 B1 | 11/2001 | Hao et al. | |

(Continued)

OTHER PUBLICATIONS

Deun et al., Multidimensional Scaling, Open and Distance Learning, Jan. 12, 2000 (pp. 1-16).

(Continued)

*Primary Examiner* — Carlos Perromat

(57) ABSTRACT

A scatter plot that represents plural periodic time intervals is animated as new data points are received, where the animating includes performing real-time backward rewriting. The real-time backward rewriting includes overlaying a subset of previously written data points with the new data points, and painting a remainder of previously written data points outside the subset in the scatter plot, where painting the remainder of previously written data points is performed without shifting pixels corresponding to the remainder. A divider structure is drawn in the scatter plot to indicate a position in the scatter plot between a current time point and a previous time point.

18 Claims, 6 Drawing Sheets

(4 of 6 Drawing Sheet(s) Filed in Color)

(56) References Cited

U.S. PATENT DOCUMENTS

| | | |
|---|---|---|
| 6,377,287 B1 | 4/2002 | Hao et al. |
| 6,429,868 B1 | 8/2002 | Dehner, Jr. et al. |
| 6,466,946 B1 | 10/2002 | Mishra et al. |
| 6,502,091 B1 | 12/2002 | Chundi et al. |
| 6,584,433 B1 | 6/2003 | Zhang et al. |
| 6,590,577 B1 | 7/2003 | Yonts |
| 6,603,477 B1 | 8/2003 | Tittle |
| 6,658,358 B2 | 12/2003 | Hao et al. |
| 6,684,206 B2 | 1/2004 | Chen et al. |
| 7,020,869 B2 | 3/2006 | Abari et al. |
| 7,202,868 B2 | 4/2007 | Hao |
| 7,313,533 B2 | 12/2007 | Chang et al. |
| 7,800,613 B2 | 9/2010 | Hanrahan et al. |
| 784,492 A1 | 11/2010 | Russell |
| 8,427,478 B2 | 4/2013 | Hao |
| 8,612,864 B2 * | 12/2013 | Moyne et al. ............ 715/744 |
| 2003/0065546 A1 | 4/2003 | Goruer et al. |
| 2003/0065817 A1 | 4/2003 | Benchetrit et al. |
| 2003/0200117 A1 | 10/2003 | Manetta et al. |
| 2003/0221005 A1 | 11/2003 | Betge-Brezetz et al. |
| 2004/0210540 A1 | 10/2004 | Israel et al. |
| 2005/0066026 A1 | 3/2005 | Chen et al. |
| 2005/0102428 A1 | 5/2005 | Heintze et al. |
| 2005/0119932 A1 | 6/2005 | Hao et al. |
| 2005/0180580 A1 | 8/2005 | Murabayashi et al. |
| 2005/0219262 A1 | 10/2005 | Hao et al. |
| 2006/0095858 A1 * | 5/2006 | Hao et al. ............ 715/764 |
| 2007/0225986 A1 | 9/2007 | Bowe, Jr. et al. |
| 2008/0033790 A1 | 2/2008 | Nickerson et al. |
| 2010/0103176 A1 * | 4/2010 | Hao et al. ............ 345/440 |
| 2010/0103189 A1 * | 4/2010 | Hao et al. ............ 345/593 |
| 2010/0231594 A1 | 9/2010 | Hao et al. |
| 2011/0029926 A1 | 2/2011 | Hao |

OTHER PUBLICATIONS http://www.pavis.org/essay/multidimensional_scaling.html, 2001 Wojciech Basalaj, (pp. 1-30).

http://processtrends.com/pg_charts_monthly_cycle_chart.htm; Horizontal Panel Chart—Monthly Cycle Chart, Feb. 25, 2008, pp. 1-3.

Office Actions of File History of U.S. Appl. No. 12/290,252, dated Nov. 16, 2012, Jun. 5, 2012, Nov. 25, 2011, and Jun. 22, 2011 (83 pages).

* cited by examiner

VISUALIZING A SCATTER PLOT USING REAL-TIME BACKWARD REWRITE

BACKGROUND

Traditional scatter plots have been widely used to display correlation or association between two variables (or attributes) of data records. A scatter plot is a chart that uses Cartesian coordinates (e.g. x-axis or y-axis coordinates) to display values for the two variables. The data displayed in the scatter plot is a collection of points, each having one coordinate on the horizontal axis and one on the vertical axis.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Some embodiments are described with respect to the following figures.

DETAILED DESCRIPTION

Figure 1:
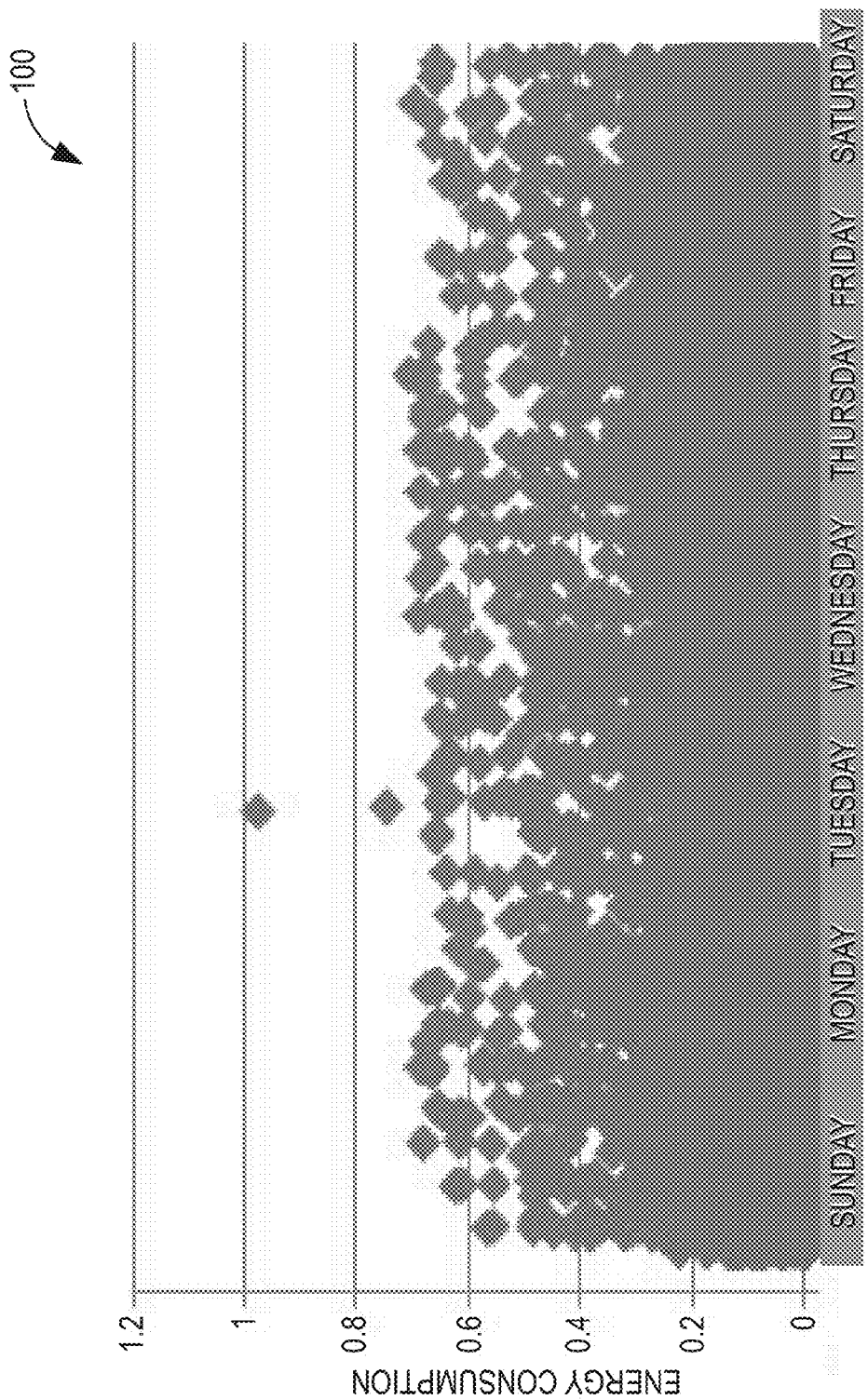
FIG. 1 illustrates a typical example scatter plot.

FIG. 1 illustrates a typical scatter plot that illustrates pixels representing data points in a predefined time period, which can cover several months, as an example. The horizontal axis of the scatter plot 100 shown in FIG. 1 depicts time intervals, including Sunday, Monday, Tuesday, Wednesday, Thursday, Friday, and Saturday. The vertical axis of the scatter plot 100 depicts an example attribute (energy consumption) of the data points shown in the scatter plot 100. Thus, the scatter plot 100 plots energy consumption (on the vertical axis) with respect to time intervals Sunday-Saturday. More generally, a scatter plot is a chart that uses Cartesian coordinates (e.g. x-axis or y-axis coordinates) to display values for two attributes (energy consumption and time in the example of FIG. 1).

Each data point plotted in the scatter plot 100 has an x coordinate that corresponds to a time interval (one of Sunday-Saturday), and a y coordinate that corresponds to energy consumption (on the vertical axis). Note that the Sunday-Saturday time intervals are periodic time intervals, which are time intervals that repeat over time. Each time interval is a daily time interval that repeats every week. For data points in a period of several months, the data points having a time attribute with value "Monday" would be plotted in a portion of the scatter plot 100 corresponding to Monday, the data points having a time attribute with value "Tuesday" would be plotted in a portion of the scatter plot 100 corresponding to Tuesday, and so forth. Effectively, the example scatter plot 100 shows weekly energy usage over a period of several months.

As can be seen in FIG. 1, most of the pixels representing the data points are clumped together such that the pixels lay on top of each other, which results in occlusion of such pixels. As a result of occlusion, the scatter plot 100 shows a relatively small number of distinct data points, since a substantial portion of the pixels representing data points are not visible. Such occlusion of data points in the traditional scatter plot 100 prevents a user from performing any meaningful analysis of the scatter plot 100, and can also hide the true extent of relationships between different attributes in the scatter plot 100.

In accordance with some implementations, visualization techniques or mechanisms are provided to allow for real-time visualization of scatter plots that increases the intelligibility of scatter plots to allow for ease of analysis or understanding of patterns and/or relationships depicted by the scatter plots. "Real-time" visualization of a scatter plot refers to a scatter plot that is updated as data points are received. "Real-time" does not mean that the update of the scatter plot has to be performed immediately upon receiving the data points—"real-time" refers generally to a process where, as data points are received, the scatter plot is updated automatically by the system without waiting for explicit user requests to update the scatter plot.

A challenge in visualizing relatively large quantities of data points as data points are continually received is how new data points are visualized without causing shifting of substantial portions of previously written data points in the scatter plot. A "previously written" data point of a scatter plot refers to a data point that has been plotted into the scatter plot. A data point is "plotted" into a scatter plot by painting a pixel representing the data point into the scatter plot. If a large portion of previously written data points are shifted in the scatter plot, that can cause a user to lose track of patterns and/or relationships between attributes that the user may have seen prior to receipt of the new data points.

In accordance with some implementations, to avoid shifting large portions of previously written data points in a scatter plot, a real-time backward rewrite technique is used to update a visualization of a scatter plot as new data points are received. The real-time backward rewrite technique involves (1) overlaying a subset of the previously written data points with new data points, and (2) plotting a remainder of the previously written data points without shifting pixels representing the remainder of the data points in the scatter plot. The "remainder" of the previously written data points includes the previously written data points outside the subset that is being overlaid with the new data points. Overlaying the subset of previously written data points with new data points refers to either (1) placing pixels representing the new data points over pixels representing the subset of previously written data points, or (2) overwriting the subset of previously written data points with the new data points (such that at least a portion of the pixels representing the subset of previously written data points are removed when the new data points are plotted in the scatter plot).

The backward rewrite is "real-time" in the sense that the backward rewrite is performed automatically as new data points are received. By performing the real-time backward rewrite technique, the scatter plot is animated as new data points are received. "Animating" a scatter plot refers to causing at least a portion of the scatter plot to change in some characteristic as new data points are received—in accordance with some implementations, such animation involves the new data points overlaying the subset of previously written data points.

To avoid shifting of pixels representing previously written data points in the scatter plot, the real-time backward rewrite technique performs painting of pixels representing the previously written data points in the scatter plot in a backward direction, starting from a later time point and proceeding backwardly to earlier time points.

In accordance with some implementations, a time divider structure (such as a time divider line or other structure) is also drawn in the scatter plot to allow for a user to quickly identify a dividing point between a current time point and a previous time point.

Figure 2A:
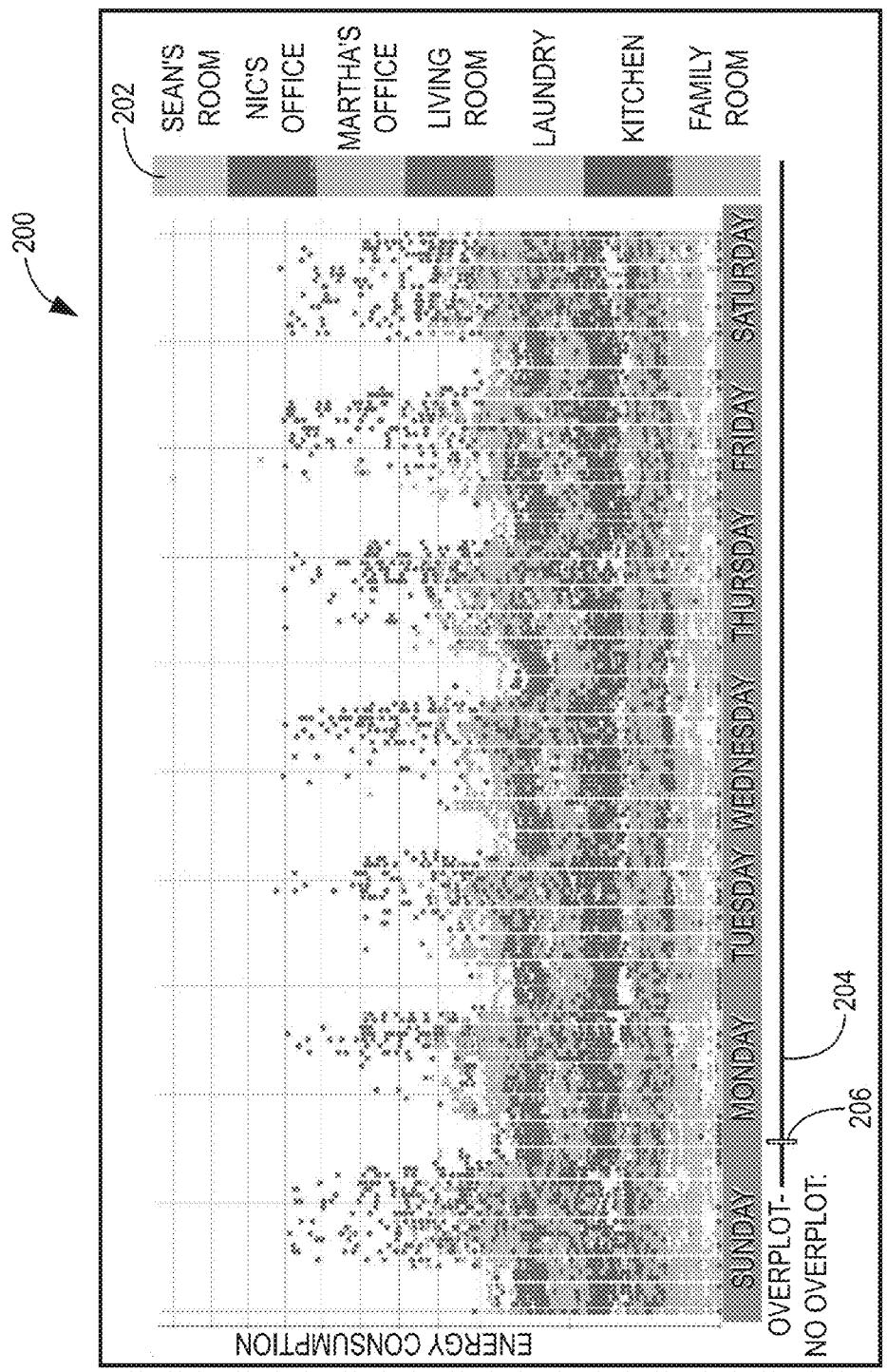
FIGS. 2A-2B and 3 illustrate scatter plot visualizations according to some implementations.

FIG. 2A illustrates a scatter plot visualization 200 according to some implementations, which has a horizontal axis depicting periodic time intervals (in this case days of the week). In other examples, the time intervals of the horizontal axis of the scatter plot visualization 200 can have other repeating time intervals, such as hours of the day or months of the year.

The vertical axis of the scatter plot visualization 200 represents another attribute of the data points, which in the example is energy consumption. The colors assigned to pixels representing the data points of the scatter plot visualization 200 represent a further attribute of the data points; in the example, the further attribute is a location attribute. A color scale 202 indicates the mapping between colors and respective values of the location attribute: different colors are assigned to different locations (e.g. Sean's room, Nic's office, Martha's office, living room, laundry room, kitchen, family room).

By assigning colors to pixels representing data points to represent the further attribute of the data points, further information can be presented to the user of the scatter plot visualization 200 while reducing occlusion among the pixels representing the respective data points. The scatter plot visualization 200 represents data points in a time period of several months, such that the number of data points depicted in the scatter plot visualization 200 is relatively large.

In accordance with some implementations, a control element 204 is provided to control the amount of overplotting of pixels. Generally, the larger the number of data points visualized in a scatter plot visualization, the greater the likelihood of overplotting of pixels (where one pixel may occlude another pixel). In some implementations, the control element 204 is a slider that has a sliding element 206 activatable by a user to slide along the horizontal direction, in examples according to FIG. 2A.

The sliding element 206 being positioned to the left side of the slider 204 allows for increased overplotting, such that more data points can be depicted in the scatter plot visualization 200. On the other hand, moving the sliding element 206 along the slider 204 to the right causes reduced overplotting, such that a smaller number of pixels are shown in the scatter plot visualization 200. Generally, movement of the sliding element 206 specifies an overplotting criterion that controls an amount of overplotting that is allowed—specifying reduced overplotting results in visualization of a smaller number of data points.

In different examples, instead of using the slider 204, a different type of control element can be used to control the amount of overplotting allowed.

Figure 2B:
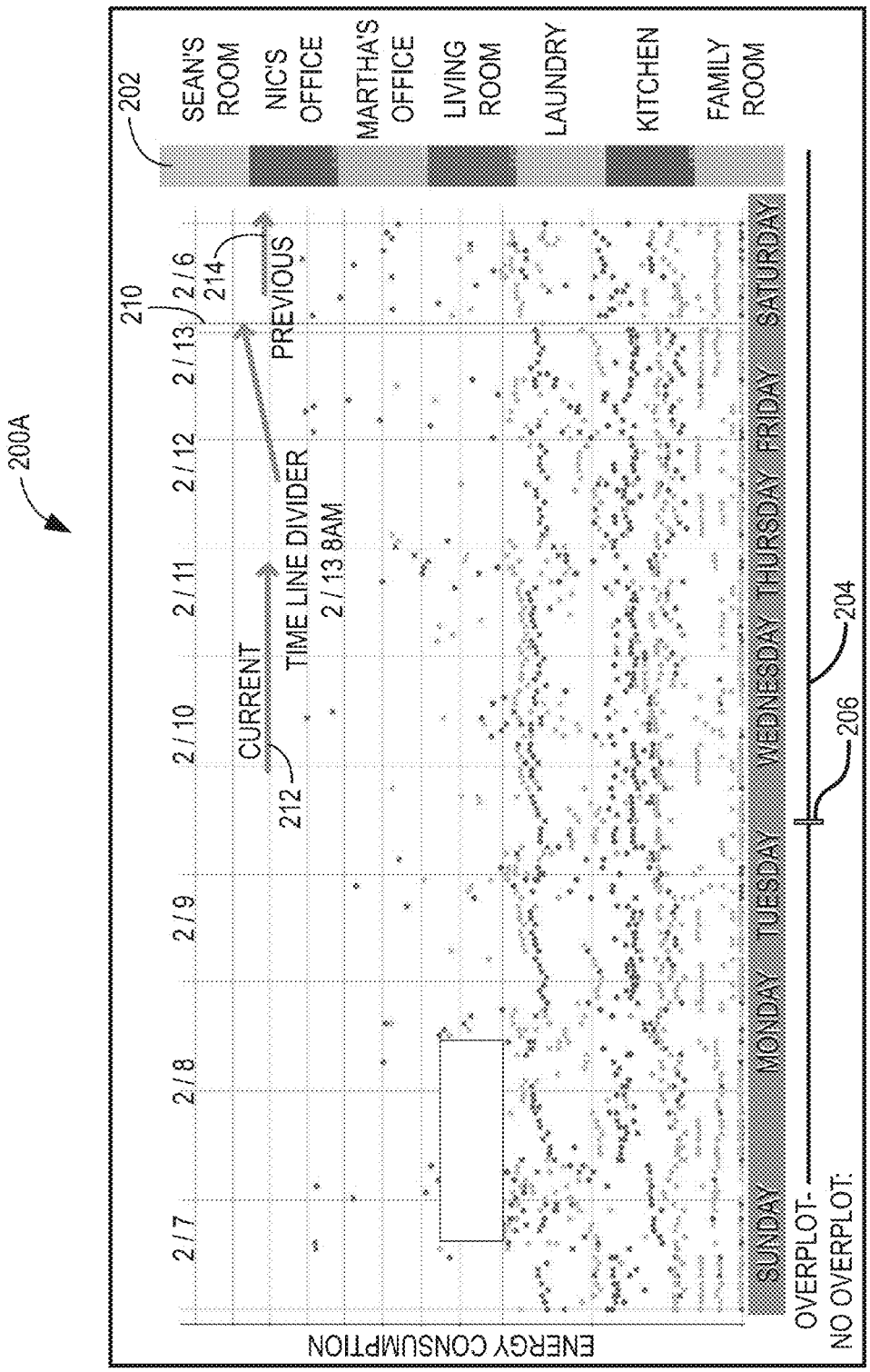

FIG. 2B shows a different example scatter plot visualization 200A, which is the scatter plot visualization 200 of FIG. 2A except that the sliding element 206 has been moved further to the right to cause less overplotting (and thus visualization of a smaller number of data points). In the example of FIG. 2B, the scatter plot visualization 200A depicts data points in one week, starting at February 6 and ending on February 13. In contrast, the scatter plot visualization 200 depicts data points over several months.

In the example of FIG. 2B, a vertical time divider line 210 divides the current time point (e.g. 2/13) and a previous time point (e.g. 2/6) to the right of the current time point visualized by the scatter plot visualization 200A. A "current time point" refers to the time point associated with the most recently received data point that is visualized by the scatter plot visualization 200A. A "previous time point" refers to a time point that is earlier than the current time point and that is to the right of the current time point in the scatter plot visualization 200A.

In examples according to FIG. 2A, time generally increases from left to right (as indicated by 2/7, 2/8, 2/9, 2/10, 2/11, 2/12, and 2/13 in FIG. 2A) in the scatter plot visualization 200A. Thus, as new data points are received and visualized in the scatter plot visualization 200A, the new data points are usually plotted to the right of previously written data points. However, after new data points are plotted in the scatter plot visualization 200A, there may still be previously written data points to the right of the new data points. To distinguish these new data points from the previously written data points that are to the right of the new data points, the vertical time divider line 210 is drawn. Note that the vertical divider line 210 is moved to the right as new data points are received and visualized in the scatter plot visualization 200A.

More generally, the vertical time divider line 210 in a scatter plot visualization is used to divide a current time point from a previous time point that is on a side of the current time point that is supposed to be greater in time than the current time point.

In the scatter plot visualization 200A, as another new group of data points is received, these new data points can overlay the data points for 2/6. In fact, according to the overplotting criterion specified by the position of the sliding element 206, at least some of the data points for 2/6 may be replaced by the new data points in the in scatter plot visualization 200A.

Figure 3:
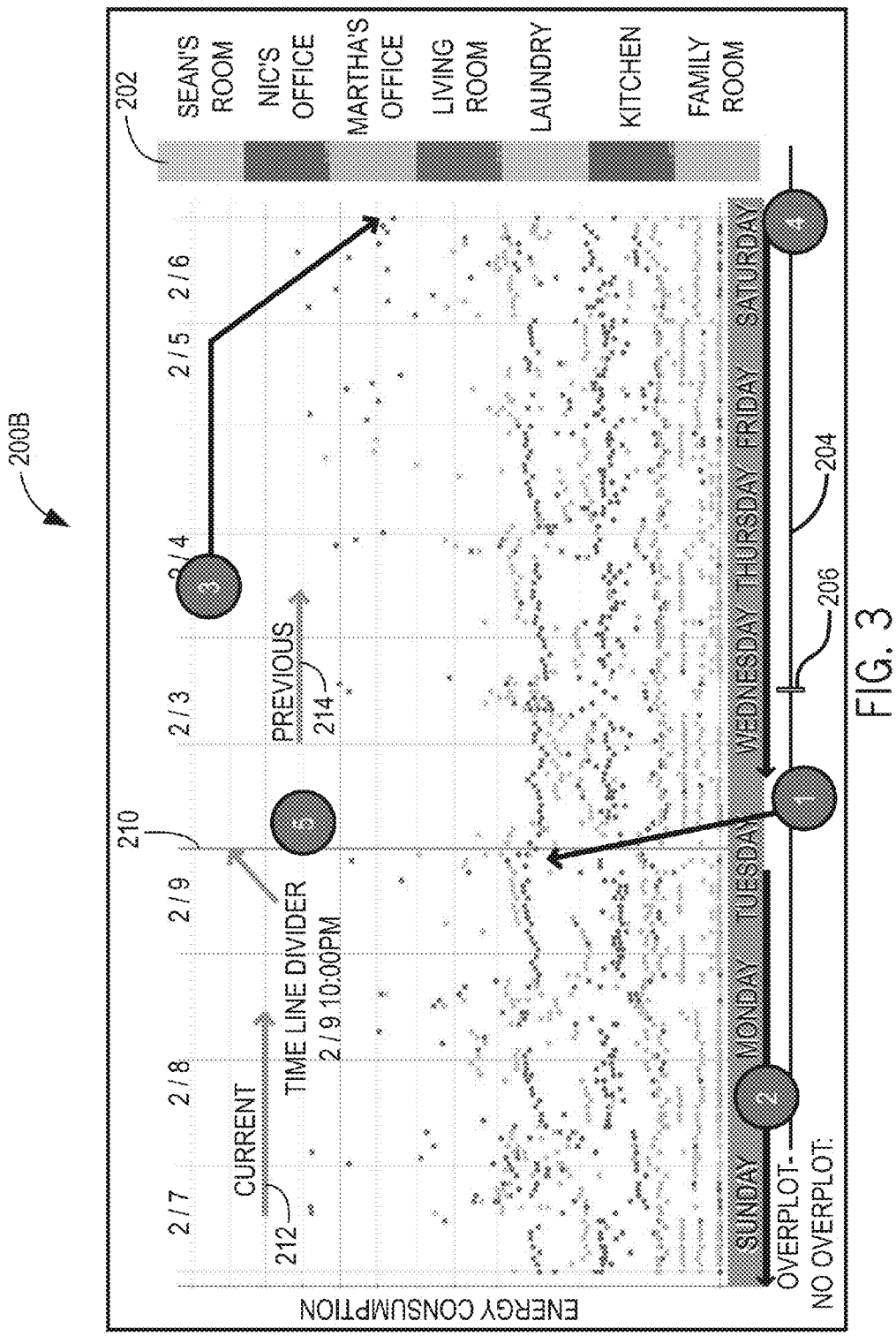
Figure 4:
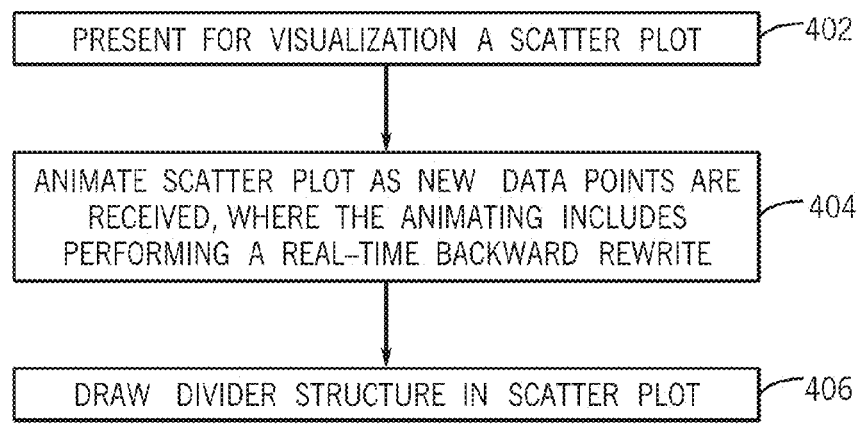
FIG. 4 is a flow diagram of a procedure for presenting a scatter plot visualization according to some implementations.

A procedure according to some implementations is discussed in reference to both FIGS. 3 and 4. As shown in FIG. 4, the procedure presents (at 402) a scatter plot for visualization, such as visualization in a display device. Data points to be visualized in the scatter plot are received in a defined moving window, where the window contains a predefined number of data points to be displayed by the scatter plot. The number of data points to be included in the moving window can be varied, such as by a user (discussed further below). Generally, new data points are received in successive groups, where each group includes a number of data points specified by the defined moving window. A predefined waiting time can be specified between two successive groups of new data points to be visualized in a scatter plot. In this manner, rather than continuously update the scatter plot visualization as data points are received, a delay corresponding to the predefined waiting time is set between updating the scatter plot visualization for successive groups of data points.

The procedure of FIG. 4 animates (at 404) the scatter plot visualization as new data points are received. The animating includes performing a real-time backward rewrite, in which the procedure overlays a subset of previously written data points with the new data points to cause pixels representing the new data points to overlay the pixels representing the subset of previously written data points. The real-time backward rewrite also includes painting a remainder of the previously written data points that are outside the subset in the scatter plot, where painting the remainder of the previously written data points is performed without shifting pixels corresponding to the remainder of data points.

The backward rewrite involves performing a backward round-robin rewriting of data points such that pixels on the scatter plot are painted starting from the most recent data point and moving backwardly in time. The reference to "round-robin" is to the fact that the time intervals shown in the scatter plot of FIG. 3 are periodic time intervals that repeat over time. The backward round-robin rewrite causes data points to be provided into these repeating time intervals.

The procedure of FIG. 4 further draws (at 406) a divider structure (e.g. the vertical divider line 210 shown in FIG. 3) in the scatter plot 200B, where drawing the divider structure in the scatter plot indicates a position in the scatter plot between a current time point and a previous time point. Note that the divider structure is moved in the scatter plot visualization as further new data points are received and visualized in the scatter plot visualization.

Further details regarding the procedure for displaying the scatter plot visualization 200B are discussed below. In FIG. 3, various circles are shown with numbers (1, 2, 3, 4, and 5) inside the circles. Each circle represents a respective task of the procedure in further detail.

The procedure starts with task 1 (a circle containing the number 1), where the procedure identifies a data point that is on the vertical time divider line 210. This data point has an index position that is equal to the current time of the data stream (in other words, the data point on the time divider line 210 is the most recent data point). Note that there can be multiple data points on the time divider line 210.

Starting from the current data point, the procedure processes the data points of the data set backwardly (task 2 in FIG. 3), working backwardly to the beginning of the data set. A monotony condition is defined that specifies that the x value of the last seen data point is greater than the x value of the current data point. The "current data point" refers to the data point that is currently being considered by the procedure as the procedure works backwardly starting from the time divider line 210 towards the beginning of the data set. Thus, the "current data point" is changed as the procedure works backwardly through the data set. The "last seen data point" refers to the data point that was seen just prior to the current data point (as the procedure works backwardly through the data set). The "x value" refers to an x coordinate along the horizontal axis of the scatter plot 200B. Since the procedure is working backwardly through the data set, the x value of the last seen data point should be greater than the current data point—in this case, the monotony condition is satisfied.

However, this monotony condition is violated when the procedure reaches the left-most portion of the scatter plot visualization 200B depicted in FIG. 3, and the procedure moves to the right-most portion of the scatter plot visualization 200B (this moves from a data point in 2/7 to a data point in 2/6, which is consistent with moving backwardly in time through the data set). However, transitioning from the left-most part of the scatter plot 200B in FIG. 3 to the right-most part of the scatter plot 200B in FIG. 3 violates the monotony condition (as detected by task 3 in FIG. 3), since the x value of the last seen data point (the data point that is on the left-most part of the scatter plot visualization 200B) will be less than the x value of the current data point (the data point that is on the right-most part of the scatter plot 200B). As a result of violating the monotony condition, a monotony-violated flag is set to the true state. This flag is referred to as isMonotonyViolated.

The procedure continues backwardly (task 4) from the right-most data point in the scatter plot visualization 200B, until the procedure reaches a data point that to the left of the time divider line 210. At that point, the procedure stops going backwardly, as all data points have been processed for painting in the scatter plot visualization 200B.

The pseudocode according to some examples for performing the procedure discussed above is set forth below. In the pseudocode below, the tasks (1-5) shown in FIG. 3 are also identified.

```
1  intcounter=pd.getTupelNumber( );
2  double firstXPos=POSITIVE_INFINITY, lastSeenXPosForMonotonyCheck=0.0;
3  boolean isMonotomyViolated=false;
4  //We are going backward through the data set
5  Iterator<DataObject> iter=pd.getDescendingiterator( );
6  while (iter.hasNext( ))
7  {
8       DataObjectcurrent = iter.next( );
9       counter--;
10      if(counter>currentPosOfAnimation)      //We have not reached the last visible point
11          continue;                          //skip this point and go to the previous one
12      If (counter == currentPosOfAnimation) ( //We found the last visible point (task 1)
13          firstXPos=current.distortedPosX;//and remember its x position
14          paintTimeDividerLine(firstXPos);
15          lastSeenXPosForMonotonyCheck= firstXPos;      //update last seen position for
16                                                        //monotony check
17      }
18      //always do the monotony check (task 3)
19      if (IisMonotonyViolated&&lastSeenXPosForMonotonyCheck<current.distortedPosX)
20          //Monotony condition of x values is violated
21          isMonotonyViolated = true;
22      //only if the monotony is violated (resulting from the round-robin fashion) we can check
23      //whether the current x position is on the left side of the time divider line. If this is the case
24      //we can skip all previous points, because there is nothing left to do. (tasks 4 and 5)
25      if (isMonotonyViolated&&current.dostortedPosX <=firstXPos)
26          break;
27      lastSeenXPosForMonotonyCheck=current.distortedPosX; //update last seen position for
28                                                          //monotony check (task 2)
29
30      doPainting(current);
31  }
```

In the pseudocode above, lines 1-5 performs various initialization functions. Line 1 of the pseudocode sets a value of a counter equal to the number of data points in the entire data set. The parameter firstXPos is set to a large value, such as infinity (line 2). A parameter lastSeenXPosForMonotony-Check is initialized to zero (line 3)—this parameter is used to detect whether the monotony condition is satisfied, as discussed above.

Line 5 specifies use of a descending iterator (to process the data set backwardly). The "while" clause in line 6 of the pseudocode iteratively goes through the data points (in the backward direction). The counter is decremented (line 9 of the pseudocode), to find the last visible point (the data point at the time divider line 210 of FIG. 3) on the scatter plot visualization 200B. If the counter value (counter) is greater than the current position of animation, currentPosOfAnimation (a comparison performed at line 10 of the pseudocode), then the last visible point (the point at the time divider line 210 in FIG. 3) has not yet been reached, and the procedure continues to attempt to find the last data point at the time divider line 210. This point is found if the condition at line 12 value is to true.

When the last visible point is found (task 1 in FIG. 3), then lines 13-15 of the pseudocode are performed. The parameter firstXPos is set equal to the current x position (line 13), and the divider line 210 is painted (line 14). The parameter lastSeenXPosForMonotonyCheck is then set equal to the value of the parameter firstXPos (line 15), which updates the last seen position for the monotony check.

The monotony check is performed at lines 19-21—if the monotony condition is violated, then the flag isMonotonyViolated is set to a true state (line 21 of the pseudocode). Once the monotony condition has been indicated as being violated, task 4 is performed to continue working backwardly through the data set. If the current position is less than or equal to the first position (as determined at line 25 of the pseudocode), then the procedure ends (line 26). Otherwise, the parameter lastSeenXPosForMonotonyCheck is set equal to the current position (line 27).

Line 30 of the pseudocode paints the current data point.

By using scatter plot visualization techniques or mechanisms according to some implementations, relatively large volumes of multi-dimensional data points (data points having multiple attributes) can be visualized to reveal patterns and relationships in the data points. The scatter plot visualization can be updated as new data points are received without shifting previously written data points in the scatter plot. In this way, users who have discovered patterns and/or relationships in data points can see such patterns and/or relationships in a relatively fixed portion of the scatter plot visualization (for a longer period of time).

Also, aggregation of data points does not have to be performed in the scatter plot visualizations. A user can move a cursor over each data point to view detailed information associated with the data point. Additionally, the amount of overlap or overplotting of pixels can be controlled by using a control slider or some other control element.

Figure 5:
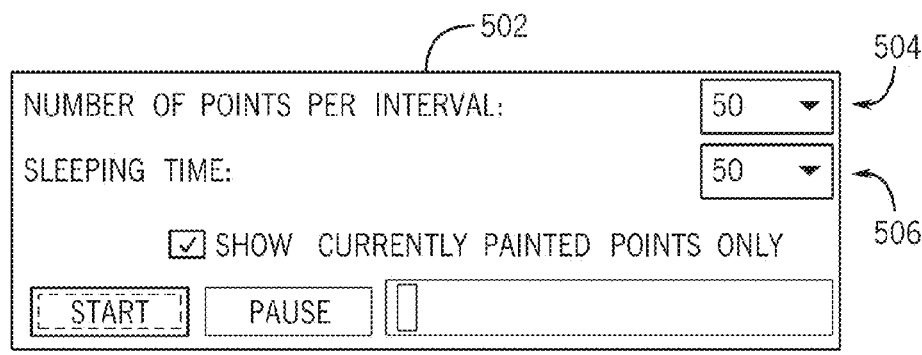
FIG. 5 is a control screen for controlling aspects of a scatter plot visualization according to some implementations.

FIG. 5 shows a GUI (graphical user interface) screen 502 in which a user can set the size of the monitoring window. In the example of FIG. 5, the size of the monitoring window is set to 50 data points (504). However, the number of data points (504) can be changed by the user if desired. In addition, according to some examples, a sleeping time (or waiting time) can be specified (506) by the user in the GUI screen 502. The sleeping time or waiting time refers to an amount of time that the procedure is to wait until the next group of data points (in the next monitoring window) is to be painted in the scatter plot visualization.

Figure 6:
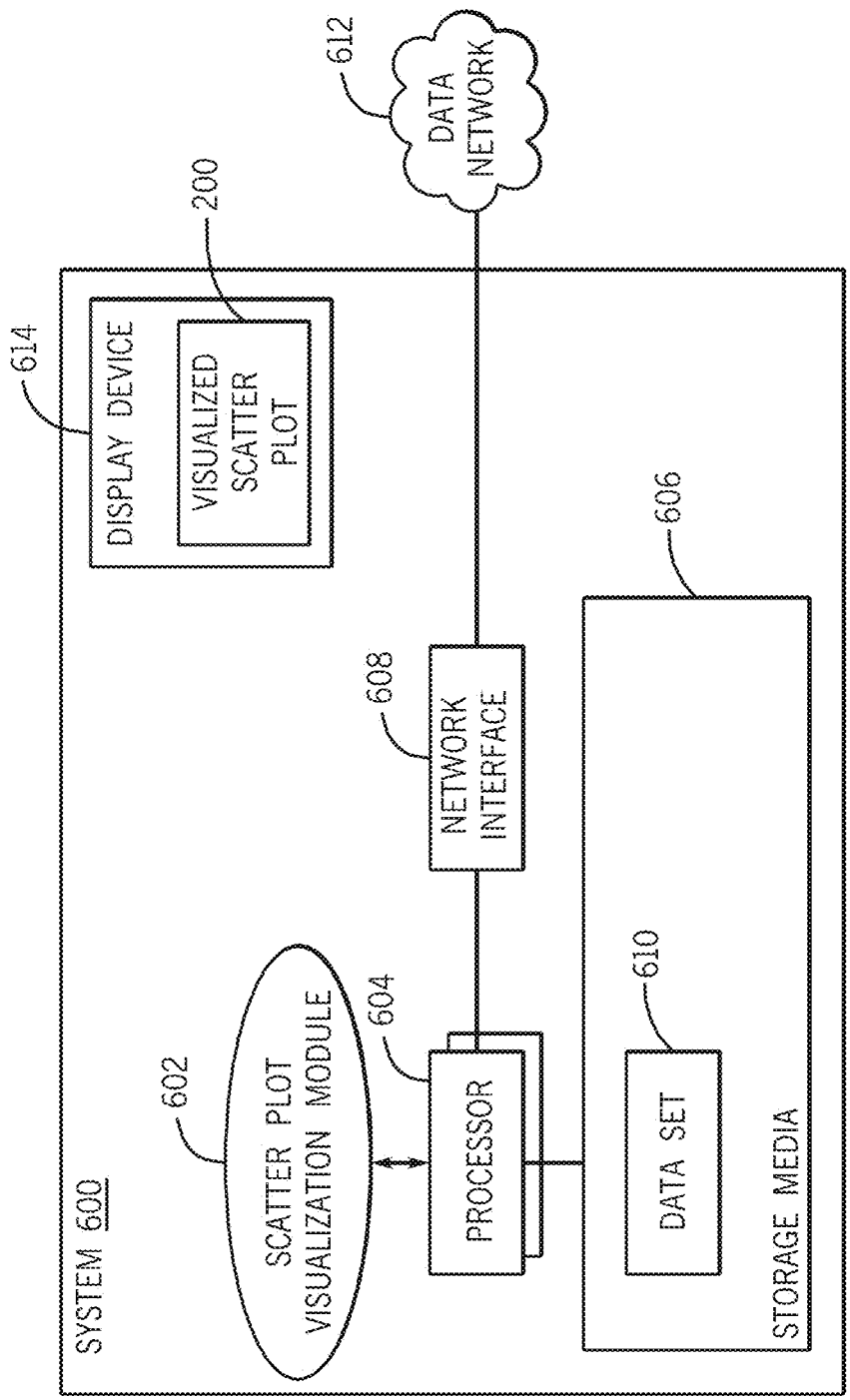
FIG. 6 is a block diagram of an example system incorporating some implementations.

FIG. 6 is a block diagram of an example system 600 that has a scatter plot visualization module 602 according to some implementations. The scatter plot visualization module 602 can perform various tasks discussed above, including those described in connection with FIGS. 3 and 4. The scatter plot visualization module 602 can also be used to present the GUI screen 502 of FIG. 5.

The scatter plot visualization module 602 is executable on one or multiple processors 604. The processor(s) 604 can be connected to storage media 606 and to a network interface 608. A processor can include a microprocessor, microcontroller, processor module or subsystem, programmable integrated circuit, programmable gate array, or another control or computing device. The storage media 606 can store a data set 610 that has been received by the system 600.

The network interface 608 allows the system 600 to communicate over a data network 612 with remote systems. The system 600 can receive data points for the data set 610 over the data network 612. The data points of the data set 610 can be visualized in the visualized scatter plot 200 in a display device 614.

The storage media 606 can be implemented as one or multiple computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method executed by a system having a processor, comprising:
  presenting a scatter plot that represents plural periodic time intervals for visualization;
  animating the scatter plot as new data points are received, wherein the animating includes performing real-time backward rewrite comprising:
    overlaying a subset of previously written data points with the new data points, and
    painting a remainder of previously written data points outside the subset in the scatter plot, where painting the remainder of previously written data points is performed without shifting pixels corresponding to the remainder;
  drawing a divider structure in the scatter plot to indicate a position in the scatter plot between a current time point and a previous time point; and
  presenting for display a control element activatable by a user to control an amount of overlapping pixels allowed in the scatter plot.

2. The method of claim 1, further comprising:
  receiving the new data points according to a moving window that specifies a number of the new data points to input together for visualization by the scatter plot.

3. The method of claim 2, further comprising:
after inputting the new data points for visualization by the scatter plot, waiting a predefined wait time interval; and
after waiting the predefined wait time interval, receiving a next group of new data points according to the moving window for visualization by the scatter plot.

4. The method of claim 3, further comprising causing display of a graphical user interface screen having fields to allow setting of the number of data points in the moving window and setting of the predefined wait time interval.

5. The method of claim 1, wherein performing the real-time backward rewrite comprises painting pixels of the scatter plot in a backward direction starting at a later time point and proceeding backwardly to earlier time points.

6. The method of claim 1, further comprising:
receiving a further group of new data points;
in response to receiving the further group, moving the divider structure and repeating the animating for the further group.

7. The method of claim 1, further comprising:
assigning colors to pixels of the scatter plot based on a first attribute of corresponding ones of the data points visualized by the scatter plot, wherein the scatter plot correlates a second attribute and a third attribute of the data points.

8. The method of claim 1, further comprising:
presenting periodic plural time intervals in the scatter plot, wherein each of the plural time intervals includes pixels representing a respective subset of the data points visualized by the scatter plot, where each periodic time interval repeats over time.

9. An article comprising at least a non-transitory machine-readable storage medium storing instructions for visualizing a scatter plot, the instructions that upon execution cause a system to:
receive a group of new data points;
in response to the received group, move a time divider structure in the scatter plot that divides a current time point and a previous time point, wherein the scatter plot represents plural periodic time intervals;
perform real-time backward rewriting to overlay pixels representing the new data points over pixels representing a subset of previously written data points to animate the scatter plot, and paint pixels of a remainder of the previously written data points outside the subset in the scatter plot without shifting the pixels of the remainder; and
present for display a control element activatable by a user to control an amount of overlapping pixels allowed in the scatter plot.

10. The article of claim 9, wherein performing the real-time backward rewriting comprises processing the new data points and the previously written data points backwardly starting from a later point in time to earlier points in time.

11. The article of claim 10, wherein processing the new data points and the previously written data points backwardly starts at a current time corresponding to the time divider structure.

12. The article of claim 10, wherein the instructions upon execution cause the system to further:
receive the group of new data points according to a moving window that specifies a number of the new data points to input together for visualization by the scatter plot.

13. The article of claim 10, wherein the instructions upon execution cause the system to further:
assign colors to the pixels representing the new data points and the previously written data points visualized by the scatter plot, wherein the assigned colors are based on values of a first attributed of the new data points and the previously written data points, and wherein the scatter plot correlates a second attribute and a third attribute of the new data points and the previously written data points.

14. The article of claim 9, wherein overlaying the pixels representing the new data points over pixels representing the subset of previously written data points comprises:
placing the pixels representing the new data points over pixels representing the subset of previously written data points, or
overwriting the subset of previously written data points with the new data points.

15. The article of claim 9, wherein the control element comprises a slider.

16. A system comprising:
a storage medium to store a data set; and
at least one processor to:
present a scatter plot that represents plural periodic time intervals for visualization of data points in the data set;
animate the scatter plot as new data points are received, by performing real-time backward rewrite comprising:
overlaying a subset of previously written data points with the new data points, and
painting a remainder of previously written data points outside the subset in the scatter plot, where painting the remainder of previously written data points is performed without shifting pixels corresponding to the remainder;
draw a divider structure in the scatter plot to indicate a position in the scatter plot between a current time point and a previous time point; and
present for display a control element activatable by a user to control an amount of overlapping pixels allowed in the scatter plot.

17. The system of claim 16, wherein the divider structure comprises a time divider line.

18. The system of claim 16, wherein the pixels have assigned colors according to values of an attribute of the data points.

* * * * *